United States Patent
Makhotin et al.

(10) Patent No.: US 10,255,591 B2
(45) Date of Patent: Apr. 9, 2019

(54) PAYMENT CHANNEL RETURNING LIMITED USE PROXY DYNAMIC VALUE

(75) Inventors: Oleg Makhotin, San Mateo, CA (US); Tom Purves, Toronto (CA); Chris Gardner, Toronto (CA)

(73) Assignee: Visa International Service Association, San Francisco, CA (US)

( * ) Notice: Subject to any disclaimer, the term of this patent is extended or adjusted under 35 U.S.C. 154(b) by 320 days.

(21) Appl. No.: 12/962,224

(22) Filed: Dec. 7, 2010

(65) Prior Publication Data

US 2011/0153498 A1 Jun. 23, 2011

Related U.S. Application Data

(60) Provisional application No. 61/288,210, filed on Dec. 18, 2009.

(51) Int. Cl.
| | | |
|---|---|---|
| G06Q 40/00 | (2012.01) | |
| G06Q 20/12 | (2012.01) | |
| G06Q 20/10 | (2012.01) | |
| G06Q 20/40 | (2012.01) | |
| G06Q 20/38 | (2012.01) | |
| G06Q 20/02 | (2012.01) | |
| G06Q 20/20 | (2012.01) | |
| G06Q 20/32 | (2012.01) | |

(52) U.S. Cl.
CPC ........... *G06Q 20/12* (2013.01); *G06Q 20/02* (2013.01); *G06Q 20/10* (2013.01); *G06Q 20/20* (2013.01); *G06Q 20/325* (2013.01); *G06Q 20/3278* (2013.01); *G06Q 20/38* (2013.01); *G06Q 20/385* (2013.01); *G06Q 20/40* (2013.01)

(58) Field of Classification Search
CPC ..................................................... G06Q 40/00
USPC .................................. 705/35, 65, 53, 41, 44
See application file for complete search history.

(56) References Cited

U.S. PATENT DOCUMENTS

| | | | |
|---|---|---|---|
| 5,280,527 | A | 1/1994 | Gullman |
| 5,336,870 | A | 8/1994 | Hughes et al. |
| 5,365,586 | A | 11/1994 | Indeck et al. |
| 5,450,537 | A | 9/1995 | Hirai et al. |
| 5,613,012 | A | 3/1997 | Hoffman |
| 5,621,201 | A | 4/1997 | Langhans |
| 5,625,669 | A | 4/1997 | McGregor et al. |
| 5,640,577 | A | 6/1997 | Scharmer |
| 5,729,591 | A | 3/1998 | Bailey |
| 5,742,845 | A | 4/1998 | Wagner |

(Continued)

FOREIGN PATENT DOCUMENTS

| | | |
|---|---|---|
| AU | 200051840 B2 | 8/2000 |
| CN | 1853189 | 10/2006 |

(Continued)

OTHER PUBLICATIONS

International Search Report and Written Opinion dated Jun. 30, 2011 in Application No. PCT/US2010/060148.

(Continued)

*Primary Examiner* — Ojo O Oyebisi
(74) *Attorney, Agent, or Firm* — Kilpatrick Townsend & Stockton LLP

(57) ABSTRACT

A central platform provides proxy dynamic values for any one of a number of a cardholder's portable payment devices, upon a request for such information made during a transaction. The proxy dynamic value can be provided to the merchant, who then can route it into the acceptance network in order to initiate the authentication process. The central platform provides the actual primary account number associated with the proxy dynamic value during the authentication process.

18 Claims, 11 Drawing Sheets

(56) References Cited

U.S. PATENT DOCUMENTS

| | | |
|---|---|---|
| 5,781,438 A | 7/1998 | Lee |
| 5,794,259 A | 8/1998 | Kikinis |
| 5,883,810 A | 3/1999 | Franklin |
| 5,887,266 A | 3/1999 | Heinonen et al. |
| 5,920,847 A | 7/1999 | Kolling et al. |
| 5,930,767 A | 7/1999 | Reber |
| 5,953,710 A | 9/1999 | Fleming |
| 5,956,699 A | 9/1999 | Wong |
| 5,974,430 A | 10/1999 | Mutschler, III et al. |
| 5,991,749 A | 11/1999 | Morrill, Jr. |
| 5,991,750 A | 11/1999 | Watson |
| 6,000,832 A | 12/1999 | Franklin |
| 6,014,635 A | 1/2000 | Harris |
| 6,029,151 A | 2/2000 | Nikander |
| 6,044,349 A | 3/2000 | Tolopka et al. |
| 6,044,360 A | 3/2000 | Picciallo |
| 6,067,621 A | 5/2000 | Yu et al. |
| 6,078,806 A | 6/2000 | Heinonen et al. |
| 6,163,771 A | 12/2000 | Walker |
| 6,206,283 B1 | 3/2001 | Bansal et al. |
| 6,226,624 B1 | 5/2001 | Watson et al. |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,343,279 B1 | 1/2002 | Bissonette et al. |
| 6,385,596 B1 | 5/2002 | Wiser |
| 6,418,326 B1 | 7/2002 | Heinonen et al. |
| 6,421,729 B1 | 7/2002 | Paltenghe |
| 6,422,462 B1 | 7/2002 | Cohen |
| 6,425,523 B1 | 7/2002 | Shem Ur |
| 6,453,301 B1 | 9/2002 | Niwa |
| 6,490,601 B1 | 12/2002 | Markus et al. |
| 6,499,042 B1 | 12/2002 | Markus |
| 6,571,339 B1 | 5/2003 | Danneels et al. |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,816,721 B1 | 11/2004 | Rudisill |
| 6,850,996 B2 | 2/2005 | Wagner |
| 6,868,391 B1 | 3/2005 | Hutlgren |
| 6,873,974 B1 | 3/2005 | Schutzer |
| 6,879,965 B2 | 4/2005 | Fung |
| 6,891,953 B1 | 5/2005 | DeMello |
| 6,901,387 B2 | 5/2005 | Wells |
| 6,907,476 B2 | 6/2005 | Wagner |
| 6,931,382 B2 | 8/2005 | Laage |
| 6,934,529 B2 | 8/2005 | Bagoren et al. |
| 6,938,019 B1 | 8/2005 | Uzo |
| 6,941,285 B2 | 9/2005 | Sarcanin |
| 6,959,202 B2 | 10/2005 | Heinonen et al. |
| 6,980,670 B1 | 12/2005 | Hoffman |
| 6,983,882 B2 | 1/2006 | Cassone |
| 6,988,657 B1 | 1/2006 | Singer et al. |
| 6,990,470 B2 | 1/2006 | Hogan |
| 6,990,472 B2 | 1/2006 | Rosenhaft et al. |
| 6,991,157 B2 | 1/2006 | Bishop |
| 7,003,493 B2 | 2/2006 | Weichert et al. |
| 7,006,993 B1 | 2/2006 | Cheong et al. |
| 7,025,256 B1 | 4/2006 | Drummond et al. |
| 7,040,533 B1 | 5/2006 | Ramachandran |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,080,049 B2 | 7/2006 | Truitt et al. |
| 7,089,208 B1 | 8/2006 | Levchin et al. |
| 7,099,850 B1 | 8/2006 | Mann, II et al. |
| 7,103,576 B2 | 9/2006 | Mann, III |
| 7,110,792 B2 | 9/2006 | Rosenberg |
| 7,110,954 B2 | 9/2006 | Yung et al. |
| 7,111,324 B2 | 9/2006 | Elteto et al. |
| 7,113,930 B2 | 9/2006 | Eccles |
| 7,119,659 B2 | 10/2006 | Bonalle et al. |
| 7,136,835 B1 | 11/2006 | Flitcroft |
| 7,150,393 B1 | 12/2006 | Drummond et al. |
| 7,159,180 B2 | 1/2007 | Ward |
| 7,177,835 B1 | 2/2007 | Walker |
| 7,177,848 B2 | 2/2007 | Hogan |
| 7,181,432 B2 | 2/2007 | Wells et al. |
| 7,184,747 B2 | 2/2007 | Bogat |
| 7,194,437 B1 | 3/2007 | Britto |
| 7,201,313 B1 | 4/2007 | Ramachandran |
| 7,207,477 B1 | 4/2007 | Ramachandran |
| 7,209,561 B1 | 4/2007 | Shankar et al. |
| 7,210,169 B2 | 4/2007 | Smith et al. |
| 7,216,292 B1 | 5/2007 | Snapper et al. |
| 7,231,045 B1 | 6/2007 | Parrott |
| 7,231,372 B1 | 6/2007 | Prange et al. |
| RE39,736 E | 7/2007 | Morrill, Jr. |
| 7,254,569 B2 | 8/2007 | Goodman et al. |
| 7,257,581 B1 | 8/2007 | Steele et al. |
| 7,264,154 B2 | 9/2007 | Harris |
| 7,268,818 B2 | 9/2007 | Karasawa |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,305,473 B2 | 12/2007 | Vogt |
| 7,314,167 B1 | 1/2008 | Kiliccote |
| 7,319,986 B2 | 1/2008 | Praisner et al. |
| 7,331,518 B2 | 2/2008 | Rable |
| 7,334,184 B2 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,353,991 B2 | 4/2008 | Esplin et al. |
| 7,356,706 B2 | 4/2008 | Scheurich |
| 7,364,071 B2 | 4/2008 | Esplin et al. |
| 7,366,703 B2 | 4/2008 | Gray et al. |
| 7,379,919 B2 | 5/2008 | Hogan |
| 7,379,920 B2 | 5/2008 | Leung et al. |
| RE40,444 E | 7/2008 | Linehan |
| 7,412,420 B2 | 8/2008 | Holdsworth |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,461,010 B2 | 12/2008 | Kwan |
| 7,469,151 B2 | 12/2008 | Khan |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,548,889 B2 | 6/2009 | Bhambri |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,584,151 B2 | 9/2009 | Wells et al. |
| 7,584,153 B2 | 9/2009 | Brown |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |

(56) References Cited

U.S. PATENT DOCUMENTS

| | | |
|---|---|---|
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Mcato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,156,543 B2 | 4/2012 | Wentker et al. |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,219,498 B2 | 7/2012 | Hammad et al. |
| 8,224,702 B2 | 7/2012 | Mengerink |
| 8,225,385 B2 | 7/2012 | Chow |
| 8,229,852 B2 | 7/2012 | Carlson |
| 8,249,957 B2 | 8/2012 | Mullen et al. |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,528,067 B2 | 9/2013 | Hurry et al. |
| 8,533,116 B2 | 9/2013 | Davis et al. |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0005840 A1 | 6/2001 | Verkama |
| 2001/0029485 A1 | 10/2001 | Brody |
| 2001/0032182 A1 | 10/2001 | Kumar et al. |
| 2001/0034720 A1 | 10/2001 | Armes |
| 2001/0042785 A1 | 11/2001 | Walker et al. |
| 2001/0049636 A1 | 12/2001 | Hudda et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029190 A1 | 3/2002 | Gutierrez-Sheris |
| 2002/0029193 A1 | 3/2002 | Ranjan |
| 2002/0035539 A1 | 3/2002 | O'Connell |
| 2002/0035548 A1 | 3/2002 | Hogan |

(56) References Cited

U.S. PATENT DOCUMENTS

| | | |
|---|---|---|
| 2002/0065774 A1 | 5/2002 | Young et al. |
| 2002/0073045 A1 | 6/2002 | Rubin |
| 2002/0091646 A1 | 7/2002 | Lake et al. |
| 2002/0091877 A1 | 7/2002 | Karidis |
| 2002/0116341 A1 | 8/2002 | Hogan |
| 2002/0133467 A1* | 9/2002 | Hobson et al. .................. 705/64 |
| 2002/0143634 A1 | 10/2002 | Kumar et al. |
| 2002/0147685 A1 | 10/2002 | Kwan |
| 2002/0147913 A1 | 10/2002 | Lun Yip |
| 2003/0018567 A1 | 1/2003 | Flitcroft et al. |
| 2003/0028481 A1 | 2/2003 | Flitcroft |
| 2003/0115142 A1 | 6/2003 | Brickell et al. |
| 2003/0126078 A1 | 7/2003 | Vihinen |
| 2003/0126094 A1* | 7/2003 | Fisher .................. G06Q 20/02 705/75 |
| 2003/0130955 A1 | 7/2003 | Hawthorne |
| 2003/0135463 A1 | 7/2003 | Brown et al. |
| 2003/0171993 A1 | 9/2003 | Chappuis |
| 2003/0191709 A1 | 10/2003 | Elston |
| 2003/0191945 A1 | 10/2003 | Keech |
| 2003/0220884 A1 | 11/2003 | Choi et al. |
| 2003/0233334 A1 | 12/2003 | Smith |
| 2004/0010462 A1 | 1/2004 | Moon |
| 2004/0019564 A1 | 1/2004 | Goldthwaite et al. |
| 2004/0049455 A1 | 3/2004 | Mohsenzadeh |
| 2004/0050928 A1 | 3/2004 | Bishop |
| 2004/0058705 A1 | 3/2004 | Morgan et al. |
| 2004/0059682 A1 | 3/2004 | Hasumi |
| 2004/0083168 A1 | 4/2004 | Kuth et al. |
| 2004/0093281 A1 | 5/2004 | Silverstein |
| 2004/0104268 A1 | 6/2004 | Bailey |
| 2004/0127256 A1 | 7/2004 | Goldthwaite et al. |
| 2004/0139008 A1 | 7/2004 | Mascavage |
| 2004/0139013 A1 | 7/2004 | Barbier et al. |
| 2004/0143532 A1 | 7/2004 | Lee |
| 2004/0158532 A1 | 8/2004 | Breck |
| 2004/0188519 A1 | 9/2004 | Cassone |
| 2004/0203489 A1 | 10/2004 | Comerford et al. |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0230526 A1 | 11/2004 | Praisner |
| 2004/0230539 A1 | 11/2004 | Praisner |
| 2004/0232225 A1 | 11/2004 | Bishop |
| 2004/0236632 A1 | 11/2004 | Maritzen |
| 2004/0248554 A1 | 12/2004 | Khan et al. |
| 2004/0254890 A1 | 12/2004 | Sancho et al. |
| 2004/0260646 A1 | 12/2004 | Berardi |
| 2005/0027608 A1 | 2/2005 | Wiesmuller et al. |
| 2005/0037735 A1 | 2/2005 | Coutts |
| 2005/0043997 A1 | 2/2005 | Sahota et al. |
| 2005/0044042 A1 | 2/2005 | Mendiola et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0144020 A1 | 6/2005 | Muzaffar et al. |
| 2005/0177517 A1 | 8/2005 | Leung et al. |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0131390 A1 | 6/2006 | Kim |
| 2006/0142058 A1 | 6/2006 | Elias et al. |
| 2006/0168653 A1 | 7/2006 | Contrera |
| 2006/0196931 A1 | 9/2006 | Holtmanns et al. |
| 2006/0204051 A1 | 9/2006 | Holland |
| 2006/0213968 A1 | 9/2006 | Guest et al. |
| 2006/0224470 A1 | 10/2006 | Garcia et al. |
| 2006/0224508 A1 | 10/2006 | Fietz |
| 2006/0229998 A1 | 10/2006 | Harrison et al. |
| 2006/0235795 A1 | 10/2006 | Johnson |
| 2006/0237528 A1 | 10/2006 | Bishop |
| 2006/0253389 A1 | 11/2006 | Hagale |
| 2006/0265325 A1 | 11/2006 | Fajardo |
| 2006/0278704 A1 | 12/2006 | Saunders |
| 2006/0294023 A1 | 12/2006 | Lu |
| 2007/0005685 A1 | 1/2007 | Chau et al. |
| 2007/0011099 A1 | 1/2007 | Sheehan |
| 2007/0011104 A1 | 1/2007 | Leger et al. |
| 2007/0022019 A1 | 1/2007 | Sherwin et al. |
| 2007/0055630 A1 | 3/2007 | Gauthier et al. |
| 2007/0094135 A1 | 4/2007 | Moore et al. |
| 2007/0107044 A1 | 5/2007 | Yuen |
| 2007/0114274 A1 | 5/2007 | Gibbs |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0178883 A1 | 8/2007 | Nandagopal |
| 2007/0179885 A1 | 8/2007 | Bird |
| 2007/0185820 A1 | 8/2007 | Talker et al. |
| 2007/0185821 A1 | 8/2007 | Wells et al. |
| 2007/0203836 A1 | 8/2007 | Dodin |
| 2007/0208671 A1 | 9/2007 | Brown |
| 2007/0228148 A1 | 10/2007 | Rable |
| 2007/0230371 A1 | 10/2007 | Tumminaro |
| 2007/0233615 A1 | 10/2007 | Tumminaro |
| 2007/0244811 A1 | 10/2007 | Tumminaro |
| 2007/0245414 A1 | 10/2007 | Chan |
| 2007/0255620 A1 | 11/2007 | Tumminaro |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro et al. |
| 2007/0284443 A1 | 12/2007 | Anson et al. |
| 2007/0288377 A1 | 12/2007 | Shaked |
| 2007/0291995 A1 | 12/2007 | Rivera |
| 2008/0001744 A1 | 1/2008 | Batra et al. |
| 2008/0003977 A1 | 1/2008 | Chakiris et al. |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad |
| 2008/0035738 A1 | 2/2008 | Mullen |
| 2008/0040276 A1 | 2/2008 | Hammad et al. |
| 2008/0040285 A1 | 2/2008 | Wankmueller |
| 2008/0052164 A1 | 2/2008 | Abifaker |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0110983 A1 | 5/2008 | Ashfield |
| 2008/0120238 A1 | 5/2008 | Flitcroft et al. |
| 2008/0133419 A1 | 6/2008 | Wormington et al. |
| 2008/0154735 A1 | 6/2008 | Carlson et al. |
| 2008/0154770 A1 | 6/2008 | Rutherford et al. |
| 2008/0155675 A1* | 6/2008 | Tu et al. ........................... 726/9 |
| 2008/0177796 A1 | 7/2008 | Eldering |
| 2008/0201264 A1 | 8/2008 | Brown |
| 2008/0201265 A1 | 8/2008 | Hewton |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0313264 A1 | 12/2008 | Pestoni |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0030845 A1 | 1/2009 | Hurry et al. |
| 2009/0037333 A1 | 2/2009 | Flitcroft |
| 2009/0037388 A1 | 2/2009 | Cooper |
| 2009/0043702 A1 | 2/2009 | Bennett |

(56) References Cited

U.S. PATENT DOCUMENTS

| | | |
|---|---|---|
| 2009/0048971 A1 | 2/2009 | Hathaway |
| 2009/0057396 A1* | 3/2009 | Barbour et al. .............. 235/379 |
| 2009/0063354 A1 | 3/2009 | Sheets et al. |
| 2009/0070260 A1 | 3/2009 | Flitcroft et al. |
| 2009/0104888 A1 | 4/2009 | Cox |
| 2009/0106112 A1 | 4/2009 | Dalmia |
| 2009/0106138 A1 | 4/2009 | Smith et al. |
| 2009/0106160 A1 | 4/2009 | Skowronek |
| 2009/0112721 A1 | 4/2009 | Hammad et al. |
| 2009/0112757 A1 | 4/2009 | Hammad et al. |
| 2009/0112766 A1 | 4/2009 | Hammad et al. |
| 2009/0112767 A1 | 4/2009 | Hammad et al. |
| 2009/0119170 A1 | 5/2009 | Hammad et al. |
| 2009/0125446 A1 | 5/2009 | Saunders et al. |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Mcato |
| 2009/0187492 A1 | 7/2009 | Hammad et al. |
| 2009/0200371 A1 | 8/2009 | Kean |
| 2009/0219430 A1 | 9/2009 | Okamoto et al. |
| 2009/0248583 A1 | 10/2009 | Chhabra |
| 2009/0255987 A1 | 10/2009 | Olivares Baena |
| 2009/0265260 A1 | 10/2009 | Aabye et al. |
| 2009/0276347 A1 | 11/2009 | Kargman |
| 2009/0281948 A1 | 11/2009 | Carlson |
| 2009/0289110 A1 | 11/2009 | Regen et al. |
| 2009/0294527 A1 | 12/2009 | Brabson |
| 2009/0307139 A1 | 12/2009 | Mardikar |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0176935 A1 | 7/2010 | Phillips |
| 2010/0185545 A1 | 7/2010 | Royyuru |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0274692 A1 | 10/2010 | Hammad |
| 2010/0274721 A1 | 10/2010 | Hammad |
| 2010/0291904 A1 | 11/2010 | Mfeldt |
| 2010/0293189 A1 | 11/2010 | Hammad |
| 2010/0293381 A1 | 11/2010 | Hammad |
| 2010/0293382 A1 | 11/2010 | Hammad |
| 2010/0299267 A1 | 11/2010 | Faith et al. |
| 2010/0306076 A1 | 12/2010 | Taveau |
| 2010/0312703 A1 | 12/2010 | Kulpati et al. |
| 2010/0318801 A1 | 12/2010 | Roberge et al. |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0040686 A1 | 2/2011 | Carlson et al. |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0218871 A1 | 9/2011 | Singh |
| 2011/0238511 A1 | 9/2011 | Park |
| 2011/0238573 A1 | 9/2011 | Varadarajan |
| 2011/0238579 A1 | 9/2011 | Coppinger |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0028609 A1 | 2/2012 | Hrka |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0019098 A1 | 1/2013 | Gupta |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |

(56) References Cited

U.S. PATENT DOCUMENTS

| | | |
|---|---|---|
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212666 A1 | 8/2013 | Mattsson |
| 2013/0218698 A1 | 8/2013 | Moon |
| 2013/0226813 A1 | 8/2013 | Voltz |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0052532 A1 | 2/2014 | Tsai |
| 2014/0052620 A1 | 2/2014 | Rogers |
| 2014/0052637 A1 | 2/2014 | Jooste |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |

FOREIGN PATENT DOCUMENTS

| | | |
|---|---|---|
| CN | 101383709 A | 3/2009 |
| CN | 102844776 | 12/2012 |
| EA | 11495 B1 | 4/2009 |
| EP | 0 739 526 A1 | 10/1995 |
| EP | 1028401 A2 | 8/2000 |
| EP | 1168265 | 1/2002 |
| EP | 2098985 | 9/2009 |
| EP | 2156397 | 2/2010 |
| FI | 100137 B1 | 9/1997 |
| FI | 108263 B1 | 12/2001 |
| GB | 2459850 | 11/2009 |
| JP | 2005-122687 A | 5/2005 |
| JP | 2008-210370 | 9/2008 |
| KR | 10-2000-0054496 | 9/2000 |
| KR | 10-2003-0076815 A | 9/2003 |
| KR | 10-2005-0019674 A | 3/2005 |
| KR | 10-2006-0096821 A | 9/2006 |
| KR | 10-2007-0100076 | 10/2007 |
| KR | 10-2007-0121618 A | 12/2007 |
| KR | 10-2008-0026802 | 3/2008 |
| KR | 10-2008-0039330 | 5/2008 |
| KR | 10-2008-0051198 A | 6/2008 |
| KR | 10-2009-0021388 | 3/2009 |
| KR | 10-2009-0044619 | 5/2009 |
| KR | 10-2010-0110642 | 10/2010 |
| RU | 2252451 | 5/2005 |
| RU | 2003132137 A | 6/2005 |
| RU | 2263347 RU | 10/2005 |
| RU | 2331110 C2 | 8/2008 |
| WO | 1996/013814 | 5/1996 |
| WO | 2000/014648 A1 | 3/2000 |
| WO | 2000/073934 A2 | 12/2000 |
| WO | 01/16900 | 3/2001 |
| WO | 2001/043092 | 6/2001 |
| WO | 2001/086598 | 11/2001 |
| WO | 02/01520 | 1/2002 |
| WO | 02/39392 A2 | 5/2002 |
| WO | 2001035304 | 5/2002 |
| WO | 02/059727 | 8/2002 |
| WO | 2002/075478 A2 | 9/2002 |
| WO | 2002/077756 A2 | 10/2002 |
| WO | 03/047208 | 6/2003 |
| WO | 2004/051585 A2 | 11/2003 |
| WO | 2004042536 | 5/2004 |
| WO | 2005/001751 A1 | 6/2004 |
| WO | 2005/109360 | 11/2005 |
| WO | 2006/099294 | 9/2006 |
| WO | 2006113834 | 10/2006 |
| WO | 2008/014554 | 2/2008 |
| WO | 2009/014554 | 2/2008 |
| WO | 2009/025605 | 2/2009 |
| WO | 2009032523 | 3/2009 |
| WO | 2010078522 | 7/2010 |
| WO | 2011075450 | 6/2011 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

EP Application No. 10838187.2, Communication with Supplemental European Search Report, dated Jan. 29, 2014.

Australian Patent Application No. 2010332045, Patent Examination Report No. 1, dated Jun. 27, 2014.

EP10838187.2, "Office Action", dated Jan. 29, 2015, 7 pages.

(56) References Cited

OTHER PUBLICATIONS

"2.4.2 How VISA Card Verification Values are Used," 2.4.2 "z/OS V1R3.0 ICSF Application Programmer's Guide" IBM Library Server, 1 page, © Copyright IBM Corp. 1997, 2002, downloaded Mar. 27, 2012 from URL: http://publibz.boulder.ibm.com/cgi-bin/bookmgr_OS390/BOOKS/CSFB4Z20/2.4.2?SHEL.

Reisinger, D., "PayPal offers SMS security key for mobile users," Nov. 24, 2008, pp. 1-3, © Copyright CBS Interactive, downloaded Mar. 27, 2012 from URL: http://news.cnet.com/8301-17939_1209-10106410-2.html.

CN201080057696.1, "Notice on the First Office Action", dated Apr. 3, 2015, 23 pages.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Decision to Grant (English Translation) dated Sep. 10, 2015 in Russian Patent Application No. 2012130396, 6 pages.

Second Office Action (English Translation) dated Dec. 2, 2015 in Chinese Patent Application No. 201080057696.1, 5 pages.

RU 2012130396, Decision on Grant,, dated Dec. 9, 2016, 6 pages.

\* cited by examiner

PAYMENT CHANNEL RETURNING LIMITED USE PROXY DYNAMIC VALUE

CROSS-REFERENCES TO RELATED APPLICATIONS

This application claims priority from U.S. Provisional Application No. 61/288,210 filed Dec. 18, 2009, which is incorporated herein by reference in its entirety for all purposes.

BACKGROUND

Current e-commerce payment practices typically require cardholders to provide a significant amount of personal and financial information to merchants. In an e-commerce or m-commerce environment, providing traditional payment detail to the merchant (e.g., card number, expiration date, billing address etc.) is often viewed as onerous and intrusive, and can very well deter potential consumers from participating in an online transaction. For merchants, the resistance in participation represents unrealized opportunities in direct sales of goods and/or services and lost opportunities for the introduction of new channels of commerce and retailing strategies.

Embodiments of the invention address these problems and other problems individually and collectively.

BRIEF SUMMARY

In embodiments of the present invention, A proxy dynamic value (token) may be issued in connection with a transaction between a cardholder and a merchant. The proxy dynamic value may then be used to obtain to an actual PAN of a portable payment device (e.g., credit card, pre-paid card, debit card, etc.) of the cardholder. The actual PAN may then be routed to the issuing bank of the portable payment device to continue with the transaction.

In embodiments of the present invention, a central platform stores cardholder data. The central platform may issue a proxy dynamic value to a cardholder or to a merchant with whom the cardholder is conducting a transaction. The proxy dynamic value may then be subsequently routed back to the central platform in order to obtain an actual PAN of a portable payment device of the cardholder. The actual PAN may then be routed to the issuing bank of the portable payment device in order to continue with the transaction.

In embodiments of the present invention, a cardholder may transmit a request to a central platform, in connection with a transaction with a merchant, in order to generate a proxy dynamic value which is associated with an actual PAN of a portable payment device issued to the cardholder. The proxy dynamic value may then be provided to the merchant's acquiring bank. The proxy dynamic value may then be substituted with the associated actual PAN, and the actual PAN may then be routed to the issuing bank that had issued the portable payment device.

DETAILED DESCRIPTION

Embodiments of the present invention include centrally storing and registering cardholder data, and allowing access to the data when making a purchase in any of numerous payment environments. Cardholder data may include data related to a portable payment device. Common examples of portable payment devices include credit cards, pre-paid cards (e.g., gift cards), and so on.

The cardholder data typically includes a primary account number (PAN) that is associated with the portable payment device; for example, the sixteen digit number that is embossed on credit cards. Conventionally, when a cardholder desires to conduct a transaction for goods or services using their portable payment device, the PAN is provided to the merchant; e.g., the merchant swipes a credit card, or the cardholder may speak it to the merchant in the case of a card not present transaction, and so on. Processing to authenticate the transaction typically begins when the merchant routes or otherwise forwards the PAN (typically, along with other data) to its acquiring bank (acquirer). The acquirer typically routes the PAN and any related data to the issuing bank (issuer) that issued the portable payment device. The issuer may authorize or deny the requested transaction, and authentication processing of the transaction then proceeds to conclusion (either with an "approval" or "denial" of the transaction) in a conventionally known manner. The transaction may then be completed accordingly.

Figure 1:
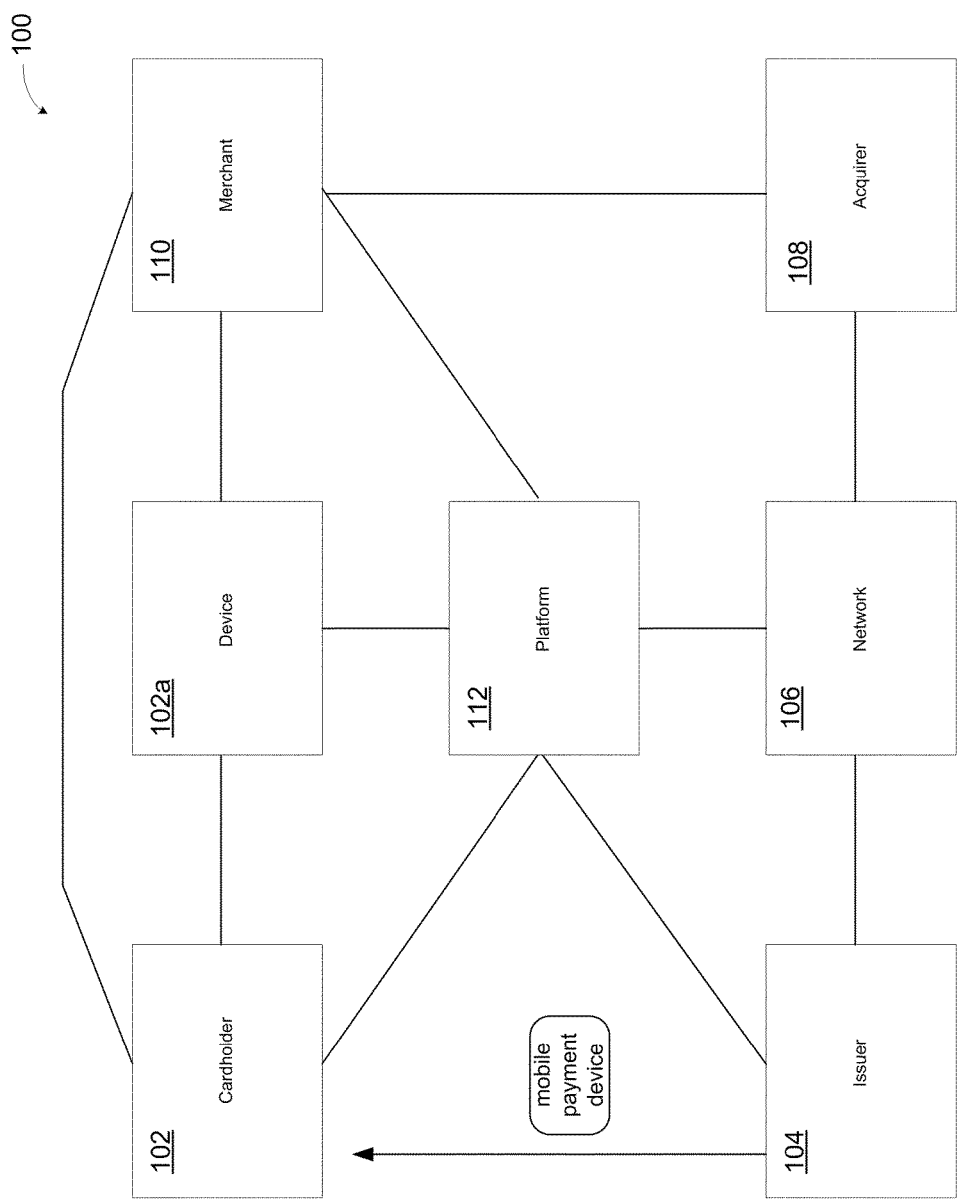
FIG. 1 is a generalized representation of an embodiment of the present invention.

Various components illustrated in FIG. 1 may be involved in conducting a transaction according to embodiments of the present invention. The cardholder (consumer) 102 may be an individual or a business entity to whom a portable payment device (e.g., credit card, debit card) is issued by an Issuer 104 (issuing bank). The Issuer 104 is typically a bank or other suitable financial entity that issues portable payment devices. The cardholder 102 may make a purchase of goods and/or services from a Merchant 110 using the portable payment device. The purchase may be made in-person (face-to-face) or as a card-not-present (CNP) transaction, e.g., via an online connection (e.g., over the Internet) or via a mobile communication device, and so on.

A payment processing network 106 may mediate a transaction between the cardholder 102 and merchant 110. Typically, the payment processing network 106 also settles accounts between the Issuer 104 and an Acquirer 108 (acquiring bank) in connection with the day's transactions (purchase, refunds, etc.) made between cardholders and the Merchant 110. Examples of payment processing networks include MasterCard, Visa, Discover, and the like. The Acquirer 108 is typically a financial entity (e.g., a bank) that holds and manages a financial account of the Merchant 110 in connection with the Merchant's business. In embodiments, the cardholder's mobile communication device 102a (e.g., cell phone, PDA—personal data assistant, and the like) may be used in the transaction.

In embodiments of the present invention, a central platform 112 may provide suitable storage (e.g., database) to store cardholder information, such as account information (e.g., primary account number (PAN), expiration date, and so on) for each portable payment device owned by the cardholder. Cardholder information may further include the cardholder's billing address(es), phone number(s), email address(es), and so on. The central platform 112 may populate its database with such information by "enrolling" cardholders.

The cardholder 102 may establish a relationship with the central platform 112 and enroll one or more of their portable payment devices with the central platform. In an embodiment, the enrollment process may include the cardholder 102 providing to the central platform 112 the card numbers (e.g., PANs) for one or more of their credit cards, or pre-paid cards, and so on. For example, enrollment may be performed online using a suitable web browser. Enrollment may further include the cardholder 102 providing the central platform with communication information that can be used to establish a communication channel with the cardholder 102. The communication information may be used to establish communication with the cardholder's mobile communication device 102a. For example, communication information may be a cell phone number of the mobile communication device 102a. The communication information may be an email address, and so on.

Enrollment may also include establishing verification information with the cardholder 102. For example, a personal identification number (PIN) for the cardholder may be created. Verification may include the use of a cryptogram. For example, the enrollment process may include storing a secure cryptographic key on the mobile communication device 102a, which can then be used to generate a cryptogram. The purpose of these security features will be explained below.

FIGS. 2-8 illustrate typical transaction scenarios in accordance with embodiments of the present invention. Before a discussion of the illustrative scenarios is given, however, a general description of transaction processing in accordance with aspects of the present invention will be provided with reference to FIGS. 1 and 1A.

Generally, in embodiments, a transaction begins with a cardholder 102 making a purchase (whether in-person, online, or over the telephone and so on), step 202. At step 204, a request may be sent by a requestor to the central platform 112 to obtain a proxy dynamic value (e.g., token, temporary PAN, alias, and the like) from the central platform. In embodiments, the requestor may be the merchant 110 or the cardholder 102.

In embodiments where the merchant 110 may send the request for a proxy dynamic value to the central platform 112, the cardholder 102 may provide communication information to the merchant who would include it in their request to the central platform 112. For example, suppose the merchant 110 is an online merchant (e.g., Amazon) with whom the cardholder 102 has established an account. The cardholder's account may include the cardholder's cell phone number, which the merchant can include in their request to the central platform 112. As another example, the cardholder 102 may simply speak the communication information to the merchant 110, in the case of a telephone call order.

Figure 1A:
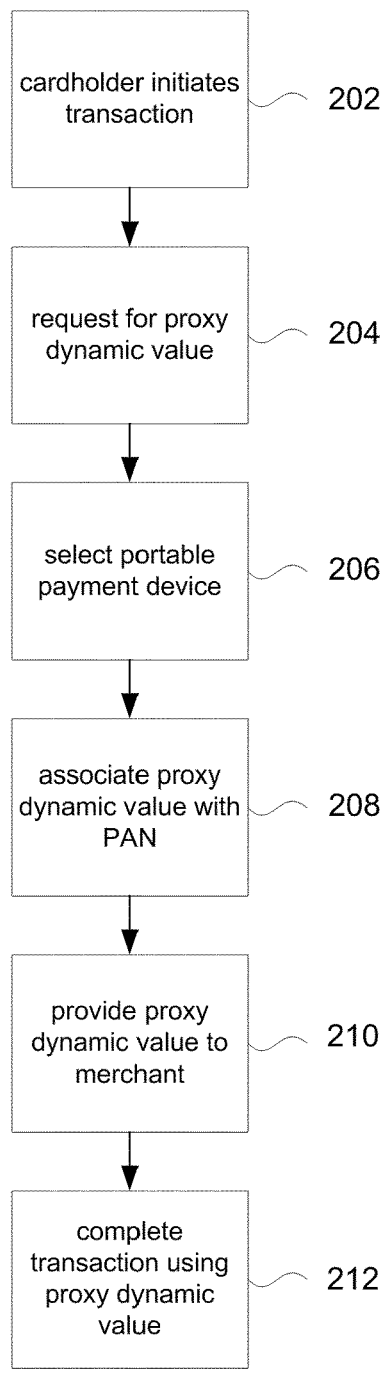

Continuing with FIG. 1A, in response to receiving a request for a proxy dynamic value from the requestor, the central platform 112 may communicate (step 206) with the cardholder 102 in order to identify a selected portable payment device from among one or more portable payment devices that have been previously enrolled with the central platform. For example, the central platform 112 may use the communication information to contact the cardholder 102. The selection process may include the central platform 112 providing the cardholder 102 with a list of portable payment devices the cardholder had been enrolled with the central platform. For example, the list may be displayed on the cardholder's mobile communication device 102a.

For security reasons, this step may include verification processing, or some form of authentication, in order to verify the cardholder 102 in order to protect the cardholder 102 and/or merchant 110 from fraudulent or otherwise unauthorized transactions. For example, a one-factor authentication (e.g., "something I know" authentication) may be conducted whereby a PIN must be provided to the central platform 112. Another type of one-factor authentication (e.g., "something I have" authentication) may use of an SE (Secure Element) chip having a secret key that can generate a unique dynamic cryptogram that is communicated to the central platform 112. The secret key may be provided to the SE chip by the central platform 112 during enrollment. Where additional security is desired, a multi-factor authentication approach may be employed by combining two or more one-factor authentication procedures.

In a step 208, the central platform 112 may associate a proxy dynamic value (token) with the received selection of the cardholder's portable payment device. In an embodiment, the proxy dynamic value can be generated by the central platform 112. In an embodiment, the proxy dynamic value can be generated by the issuing bank 104 that issued the selected portable payment device.

The proxy dynamic value may be an arbitrary value that can be mapped to or otherwise associated with the PAN of the selected portable payment device, but otherwise does not reveal the actual PAN of the selected portable payment device. The proxy dynamic value may be used only once, or may have a limited number of uses, or may have a limited time, or its use may otherwise be limited based on other criteria. By limiting the "lifetime" of the proxy dynamic value, the risk of fraud can be reduced.

In an embodiment, the proxy dynamic value can be formatted like a sixteen digit primary account number of a credit card. This would be suitable for use in a legacy system where the existing acceptance network (e.g., the communication infrastructure interconnecting the merchant, acquirer, payment processor, and issuer) recognizes conventional sixteen digit primary account numbers, and thus would not need to be modified for operation in accordance with the present invention. Generally, however, the proxy dynamic value may comprise any suitable data format and/or data.

In a step 210, the central platform 112 may provide the proxy dynamic value to a recipient. In an embodiment, the proxy dynamic value may be communicated directly to the merchant 110. In an embodiment, the proxy dynamic value may be communicated to the cardholder 102, who can then communicate the proxy dynamic value to the merchant 110.

In a step 212, the transaction may then be authenticated using the proxy dynamic value. In embodiments, the merchant 110 may receive the proxy dynamic value and route the proxy dynamic value to its acquiring bank 108 as part of the standard authentication process. The acquiring bank 108, in turn, may then route the proxy dynamic value to the payment processing network 106. In an embodiment, the processing network 106 may communicate with the central platform 112, and use the received proxy dynamic value to obtain the actual PAN that corresponds to the selected portable payment device. The payment processing network 106 may then route the actual PAN received from the central platform 112 to the issuing bank 104 in order to continue with the authentication process.

In an embodiment, the processing network 106 may route the proxy dynamic value directly to the issuing bank 104. For example, where the issuing bank 104 is the entity that provided the proxy dynamic value in the first place, then the issuing bank can determine the actual account number of the selected portable payment device in order to continue with the authentication process. However, if the central platform 112 had generated the proxy dynamic value which was then routed directly to the issuing bank 104, then the issuing bank may communicate with the central platform to obtain the corresponding actual PAN. Either way, when the issuing bank 104 gains possession of the actual PAN, it may then continue with the authentication process, and the transaction can then be concluded in accordance with the results of the authentication.

A discussion of some illustrative transaction scenarios in accordance with embodiments of the present invention will now be given in connection with FIGS. 2-8. In each figure, transaction or data flows and processes are indicated by numbered circles. An enrollment process, such as the one explained above, is identified in each figure by the circle numbered zero (step 0).

Figure 2:
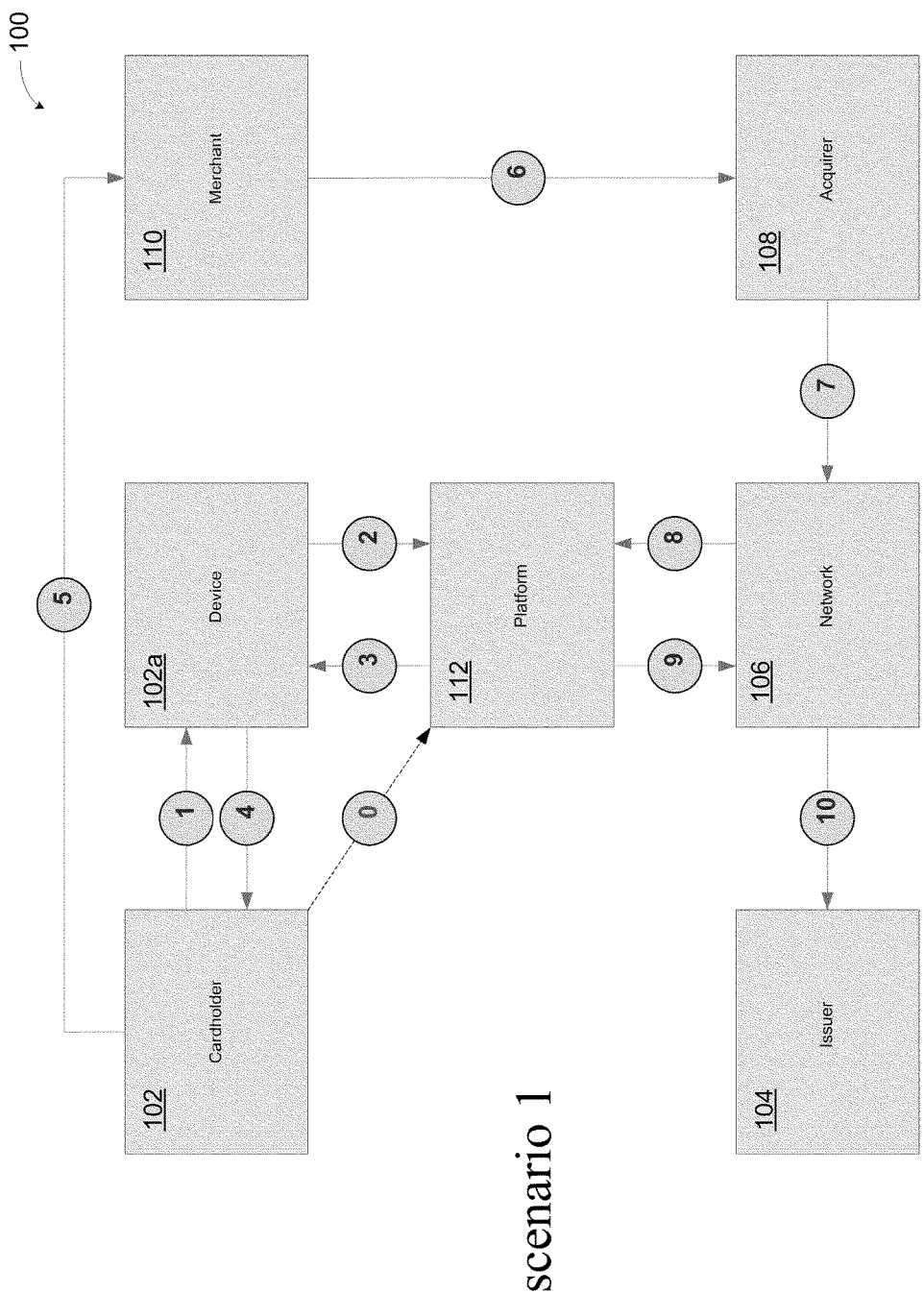
FIGS. 2-8 are flow diagrams of transaction processing scenarios contemplated in accordance with embodiments of the present invention.

FIG. 2 illustrates a typical transaction scenario (scenario 1) in accordance with an embodiment of the present invention for online purchasing (e.g., using a web browser), which is a class of transactions generally referred to as "card not present" (CNP) transactions. In this embodiment, the merchant 110 requires no integration with the central platform 112.

A transaction may commence, for example, with a cardholder 102 making an online purchase with the merchant 110 using a web browser. At steps 1-3, the cardholder 102 may send a request to the central platform 112 for a proxy dynamic value using a mobile application running on their mobile communication device 102a. The cardholder 102 may interact with the central platform 112 to select a portable payment device from a list of portable payment devices with which to conduct the transaction as described above. Also as explained above, this may include a verification process to verify the cardholder 102.

At step 4, if the cardholder 102 is verified, the central platform 112 may respond with a proxy dynamic value. In an embodiment, the proxy dynamic value may be a temporary PAN (TPAN) that is not the actual PAN of the selected portable payment device. The central platform 112 may provide the TPAN and related card-type information such as expiry date and a OW (card verification value) to the cardholder's mobile communication device 102a. The received information can be displayed on the cardholder's mobile communication device 102a. At step 5, the cardholder 102 can then provide the TPAN and any related information to the merchant 110, for example, by entering the data into data fields of the merchant's online shop using the web browser.

Authentication processing may include the merchant 110 routing the TPAN to the acquirer 108 (step 6), who then sends it to the payment network 106 (step 7). The payment network 106 may then route the TPAN to the central platform 112 (step 8), which then substitutes the received TPAN with an actual PAN and sends it back to the payment network (step 9). The payment network 106 may then route the actual PAN to the issuer 104 (step 10) in order to continue with the authentication process. It is noted that during the clearing process (e.g., at the end of the business day), a similar TPAN substitution process may be performed in order to map to actual PANs.

Figure 3:
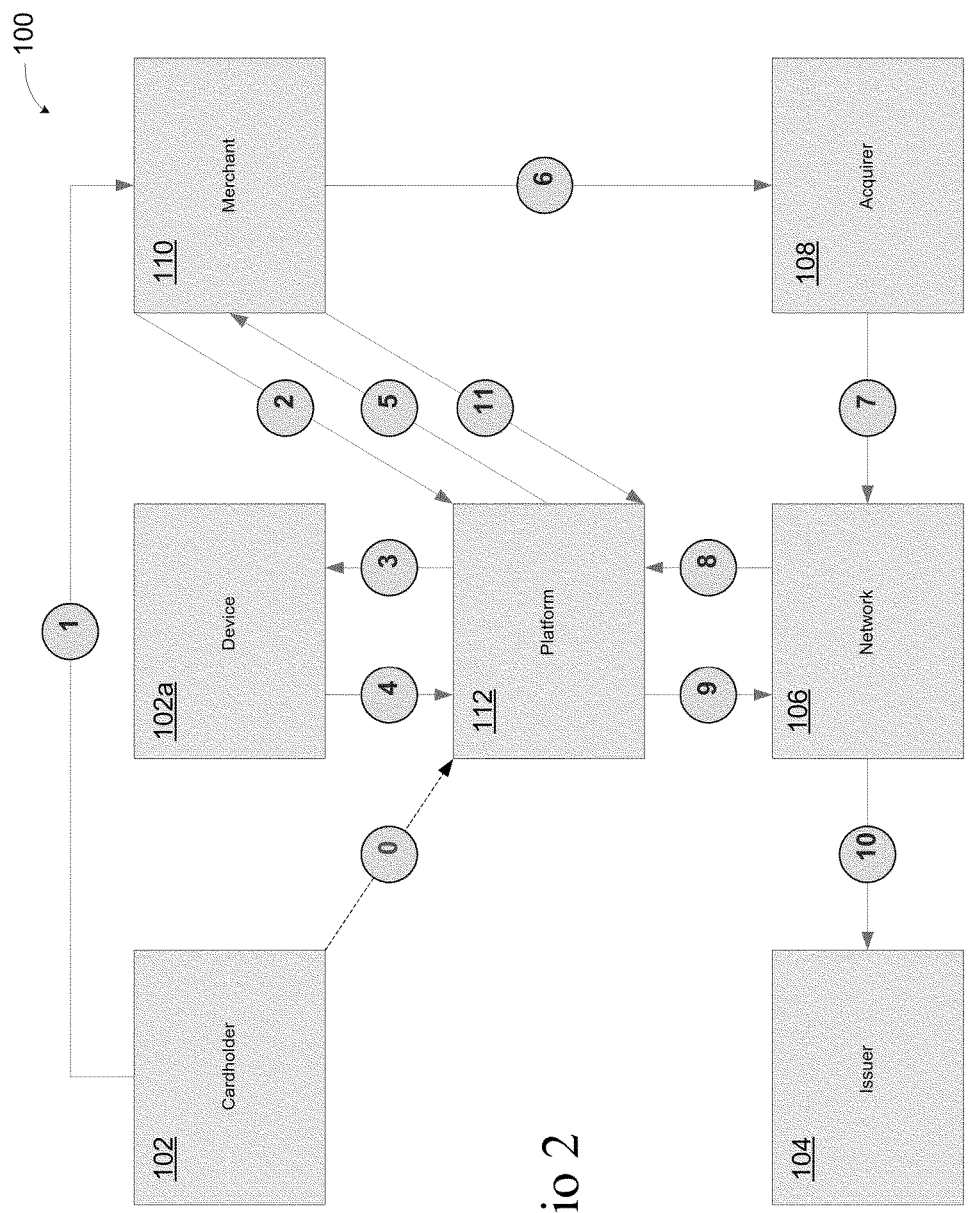

FIG. 3 illustrates a typical transaction scenario (scenario 2) in accordance with an embodiment of the present invention for online purchasing in which the merchant 110 operates in conjunction with the central platform 112 to service transactions.

A transaction may commence, for example, with a cardholder 102 making an online purchase with the merchant 110 using a web browser (step 1). During the check out process, the cardholder 102 may provide their communication information (e.g., cell phone number) to the merchant website, instead of their credit card information as is typically done. At step 2, the merchant 110 or a merchant-provided browser plug-in may send a request to the central platform 112 for a proxy dynamic value, including providing the cell phone number to the central platform. At steps 3 and 4, the central platform 112 may establish communication with the cardholder 102 in response to receiving the request so that the cardholder can select a portable payment device as explained above, including perhaps conducting a verification process to verify the cardholder.

At step 5, if the cardholder 102 is verified, the central platform 112 may respond with a proxy dynamic value. In an embodiment, the proxy dynamic value may be a temporary PAN (TPAN). The central platform 112 may send the TPAN to the merchant 110, along with ancillary information such as the cardholders' shipping address and billing address.

Authentication processing may include the merchant 110 routing the TPAN to the acquirer 108 (step 6), who then sends it to the payment network 106 (step 7). The payment network 106 may then route the TPAN to the central platform 112 (step 8), which then substitutes the received TPAN with an actual PAN and send it back to the payment network (step 9). The payment network 106 may then route the actual PAN to the issuer 104 (step 10) to complete the authentication process. It is noted that during the clearing process (e.g., at the end of the business day), a similar TPAN substitution may be performed.

The merchant 110 may provide a transaction report (step 11) to the central platform 112 for subsequent cardholder accounting purposed.

Figure 4:
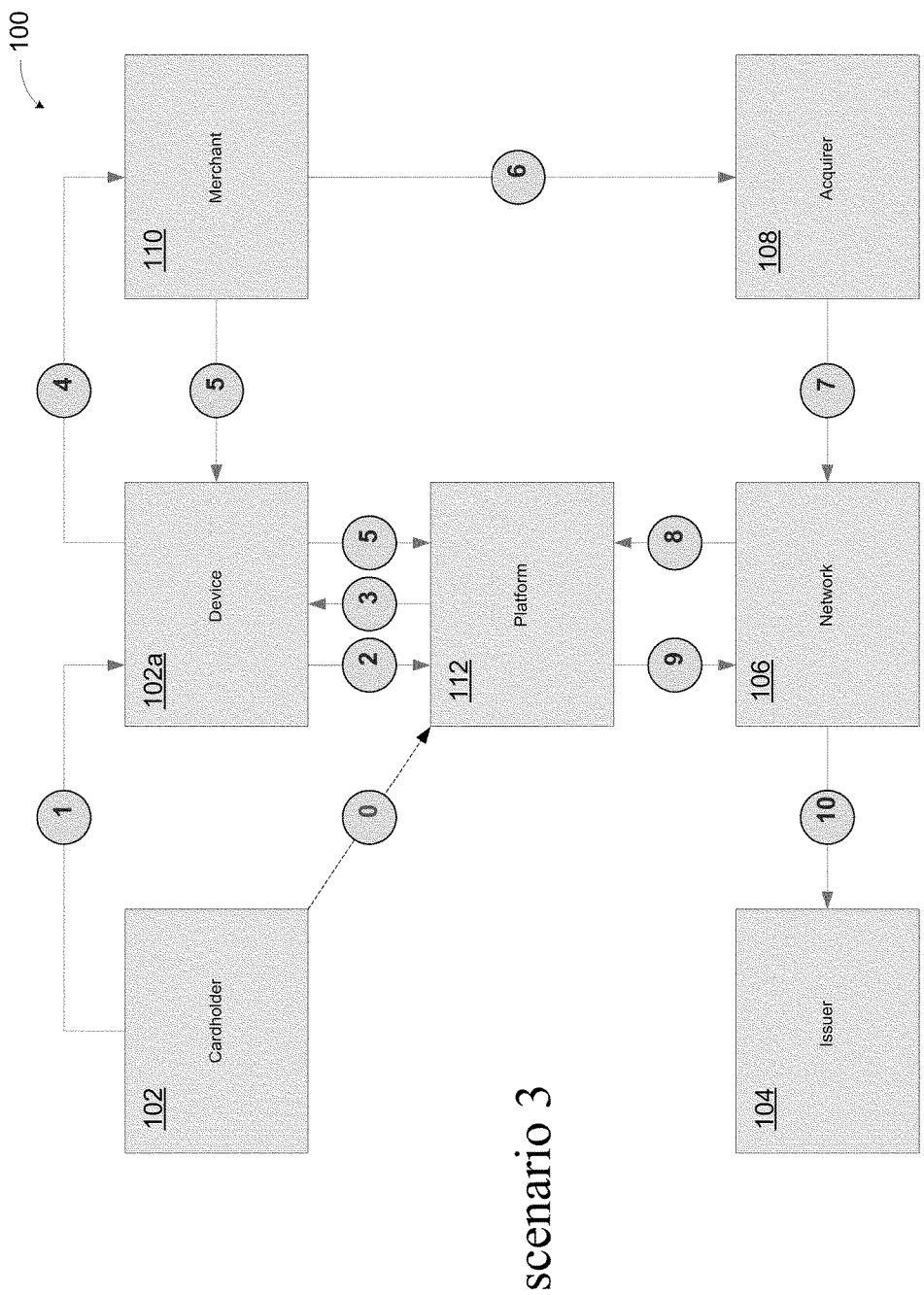

FIG. 4 illustrates a typical transaction scenario (scenario 3) in accordance with an embodiment of the present invention for "face to face" transactions where the cardholder 102 is physically present (a class of transactions generally referred to as "card present" transactions). In this embodiment, the merchant 110 requires no integration with the central platform 112.

A transaction may commence, for example, with a cardholder 102 using a mobile application running on their mobile communication device 102a to pre-select an order at the merchant 110 (step 1). At step 2, the cardholder 102 may send a request to the central platform 112 for a proxy dynamic value. The central platform 112 may then establish communication with the cardholder 102 in response to receiving the request in order to identify a selected portable payment device from the cardholder as describe above, including perhaps conducting a verification process to verify the cardholder.

At step 3, if the cardholder 102 is verified, the central platform 112 may with a proxy dynamic value. In an embodiment, the proxy dynamic value may be a temporary PAN (TPAN). The central platform 112 may provide the TPAN as a 2-dimensional (2D) barcode MMS and other order information. At step 4, the cardholder 102 can then provide the TPAN and other order information to the merchant 110, for example, using near-field communications (NFC) technology if the mobile communication device 102a and the merchant 110 are suitably equipped. In an embodiment, the merchant 110 may use a barcode reader to scan the information off of the cardholder's mobile communication device 102a.

Where the cardholder's mobile communication device 102a has NFC, the merchant's NFC device may receipt information for the transaction to the cardholder's mobile communication device. The mobile communication device 102a may then pass such information back to the central platform 112 where it may be stored for subsequent cardholder accounting purposes (step 5).

Authentication processing may include the merchant 110 routing the TPAN to the acquirer 108 (step 6), who then sends it to the payment network 106 (step 7). The payment network 106 may then route the TPAN to the central platform 112 (step 8), which then substitutes the received TPAN with an actual PAN and send it back to the payment network (step 9). The payment network 106 may then route the actual PAN to the issuer 104 (step 10) to complete the authentication process. It is noted that during the clearing process (e.g., at the end of the business day), a similar TPAN substitution may be performed.

Figure 5:
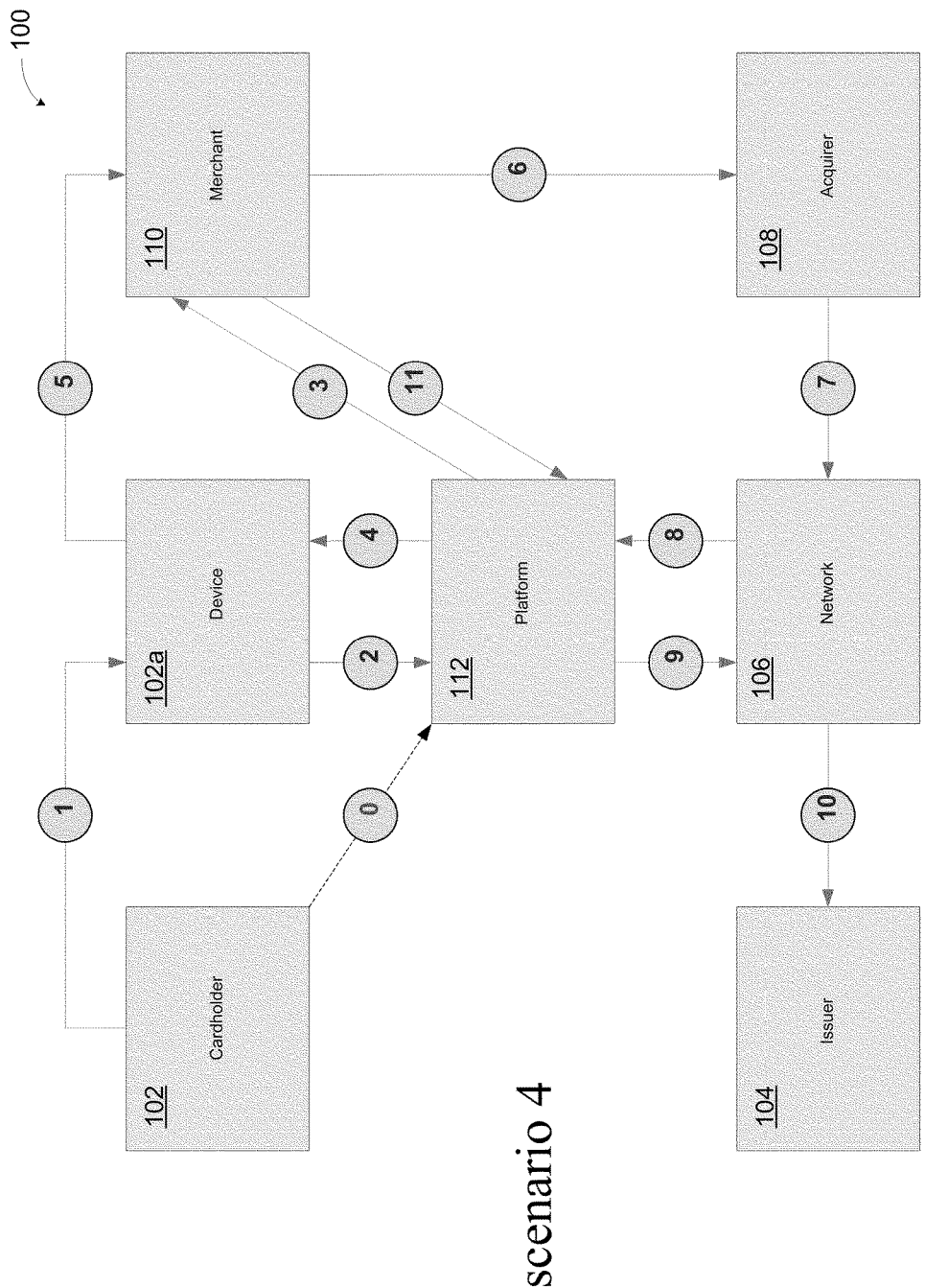

FIG. 5 illustrates a typical transaction scenario (scenario 4) in accordance with an embodiment of the present invention for "face to face" transactions in which the merchant 110 operates in conjunction with the central platform 112 to service transactions.

A transaction may commence, for example, with a cardholder 102 using a mobile application running on their mobile communication device 102a to pre-select an order at the merchant 110 (step 1). At step 2, the cardholder 102 may send a request to the central platform 112 for a proxy dynamic value. The central platform 112 may then establish communication with the cardholder 102 in response to receiving the request in order to identify a selected portable payment device from the cardholder as describe above, including perhaps conducting a verification process to verify the cardholder.

At step 3, the central platform 112 may send order details and an invoice number for the order to the merchant 110, allowing the merchant to begin preparing the order.

At step 4, if the cardholder 102 is verified, the central platform 112 may respond to the mobile communication device 102a with a proxy dynamic value. In an embodiment, the proxy dynamic value may be a temporary PAN (TPAN). The central platform 112 may provide the TPAN as a 2-dimensional bar code MMS along with other order information. The central platform 112 may send the invoice number from step 3 represented as a near-field communication (NFC) tag or a 2D barcode.

At step 5, the cardholder 102 can then provide the TPAN and other order information to the merchant 110, for example using NFC technology, if the mobile communication device 102a and the merchant 110 are suitably equipped. In an embodiment, the merchant 110 may use a barcode reader to scan the information off of the cardholder's mobile communication device 102a. The merchant 110 can then compare the information with its own data and provide the order to the cardholder 102.

Authentication processing may include the merchant 110 routing the TPAN to the acquirer 108 (step 6), who then sends it to the payment network 106 (step 7). The payment network 106 may then route the TPAN to the central platform 112 (step 8), which then substitutes the received TPAN with an actual PAN and sends the actual PAN to the payment network (step 9). The payment network 106 may then route the actual PAN to the issuer 104 (step 10) to complete the authentication process. It is noted that during the clearing process (e.g., at the end of the business day), a similar TPAN substitution may be performed.

The merchant 110 may provide a transaction report (step 11) to the central platform 112 for subsequent cardholder accounting purposed.

Figure 6:
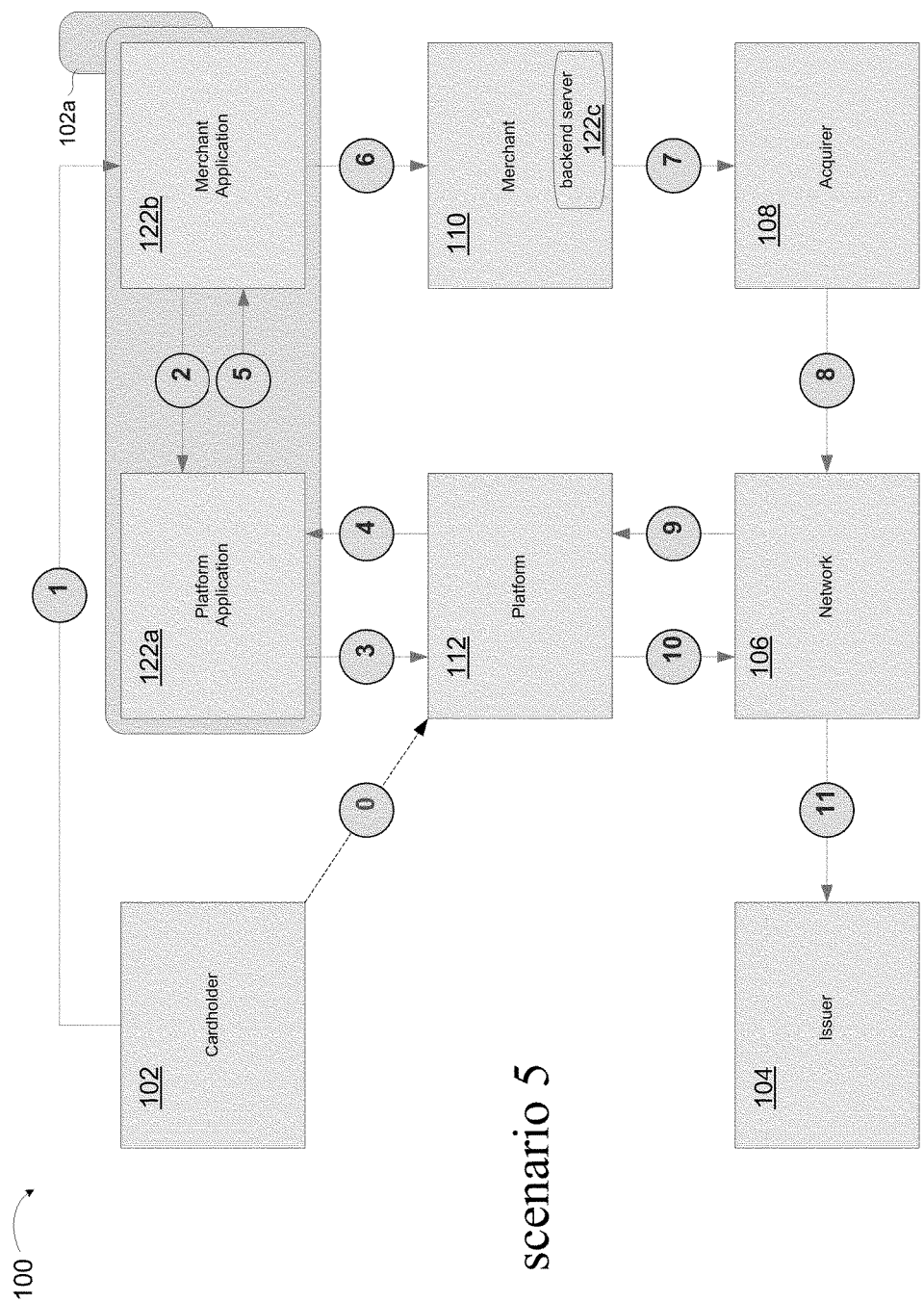

FIG. 6 illustrates a typical transaction scenario (scenario 5) in accordance with an embodiment of the present invention for mobile and remote purchasing (e.g., using a cell phone), another example of the class of transactions generally referred to as "card not present" (CNP) transactions. In this embodiment, the merchant 110 does not involve direct communication with the central platform 112.

A transaction may commence, for example, with a cardholder 102 using their mobile communication device 102a to make a purchase (step 1). For example, FIG. 6 shows a merchant application 122b (i.e., software) provided in, and executing on, the mobile communication device 102b. At step 2, during check-out processing, the merchant application 122b may communicate with a platform application 122a (i.e., software) also executing on the mobile communication device 102a to send a request for a proxy dynamic value to the platform application. At step 3, the platform application 122a may interact with the cardholder 102 in order to identify a selected portable payment device from the cardholder as described above, including perhaps conducting a verification process to verify the cardholder. The platform application 122a may then forward the selected portable payment device to the central platform 112.

At step 4, if the cardholder 102 is verified, the central platform 112 may respond to the platform application 122a with a proxy dynamic value. In an embodiment, the proxy dynamic value may be a temporary PAN (TPAN). The central platform 112 may provide the TPAN and related card-type information such as expiry date and a OW (card verification value) to the cardholder's mobile communication device 102a.

At step 5, the platform application 122a may then forward the received information to the merchant application 122b. At step 6, the merchant application 122b may communicate the TPAN and related card details as well as payment order information to a merchant backend server system 122c of the merchant 110.

Authentication processing may include the merchant backend server 122c routing the TPAN to the acquirer 108 (step 7), who then sends it to the payment network 106 (step 8). The payment network 106 may then route the TPAN to the central platform 112 (step 9), which then substitutes the received TPAN with an actual PAN and sends it back to the payment network (step 10). The payment network 106 may then route the actual PAN to the issuer 104 (step 11) in order to continue with the authentication process. It is noted that during the clearing process (e.g., at the end of the business day), a similar TPAN substitution may be performed.

Figure 7:
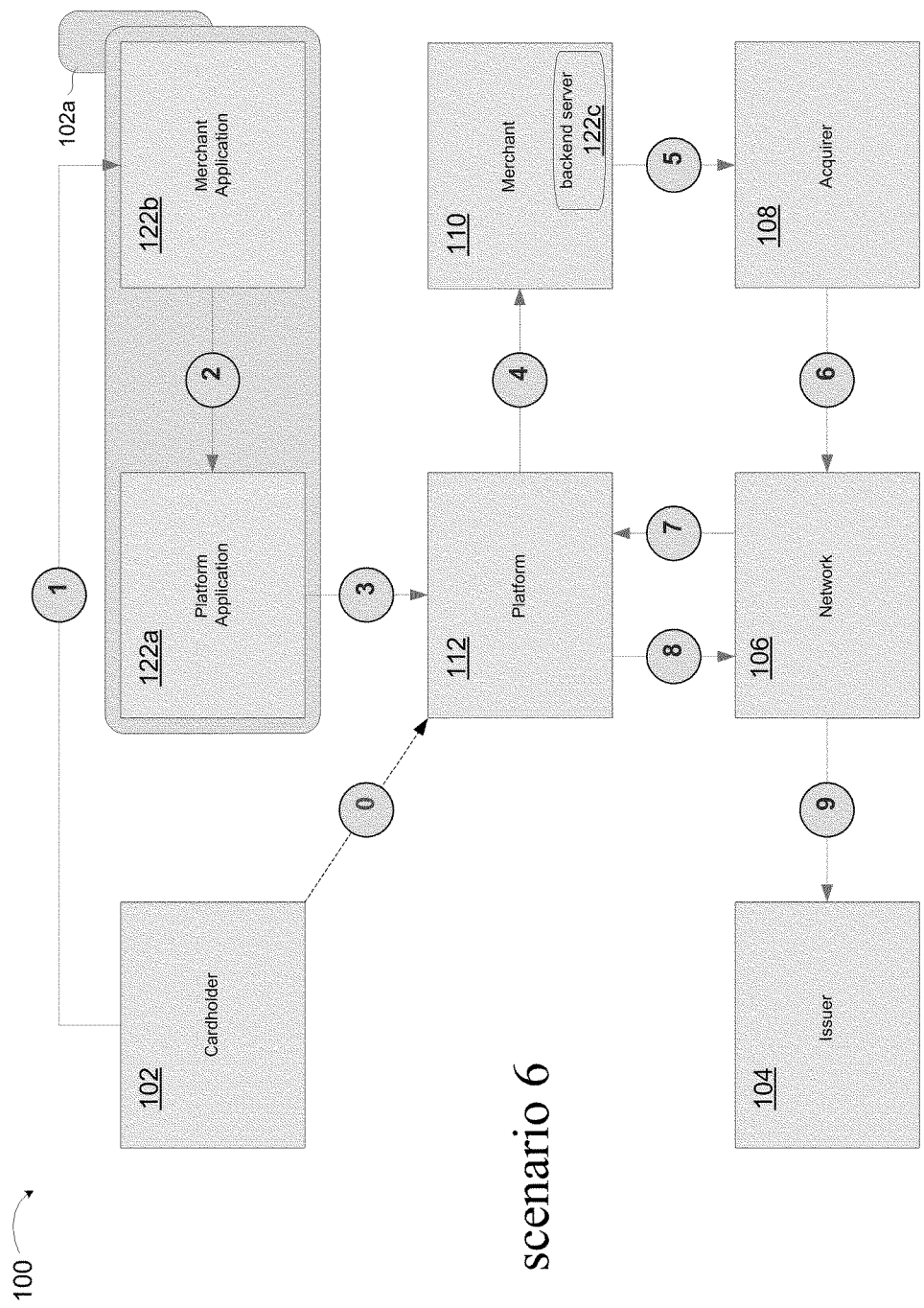

FIG. 7 illustrates a typical transaction scenario (scenario 6) in accordance with an embodiment of the present invention for mobile and remote purchasing (e.g., using a cell phone) wherein the merchant 110 communicates with the central platform 112.

A transaction may commence, for example, with a cardholder 102 using their mobile communication device 102a to make a purchase (step 1). For example, FIG. 7 shows a merchant application 122b provided in, and executing on, the mobile communication device 102b. At step 2, during check-out processing, the merchant application 122b may communicate with a platform application 122a also executing on the mobile communication device 102a to send a request for a proxy dynamic value to the platform application. At sep 3, the platform application 122a may interact with the cardholder 102 in order to identify a selected portable payment device from the cardholder as explained above, including perhaps conducting a verification process to verify the cardholder. The platform application 122a may then forward the selected portable payment device to the central platform 112. At step 4, if the cardholder 102 is verified, the central platform 112 may send a proxy dynamic value (e.g., a TPAN) along with purchase order information to the merchant backend server 122c of the merchant 110.

Authentication processing may include the merchant backend server 122c routing the TPAN to the acquirer 108 (step 5), who then sends it to the payment network 106 (step 6). The payment network 106 may then route the TPAN to the central platform 112 (step 7), which then substitutes the received TPAN with an actual PAN and sends it back to the payment network (step 8). The payment network 106 may then route the actual PAN to the issuer 104 (step 9) in order to continue with the authentication process. It is noted that during the clearing process (e.g., at the end of the business day), a similar TPAN substitution may be performed.

Figure 8:
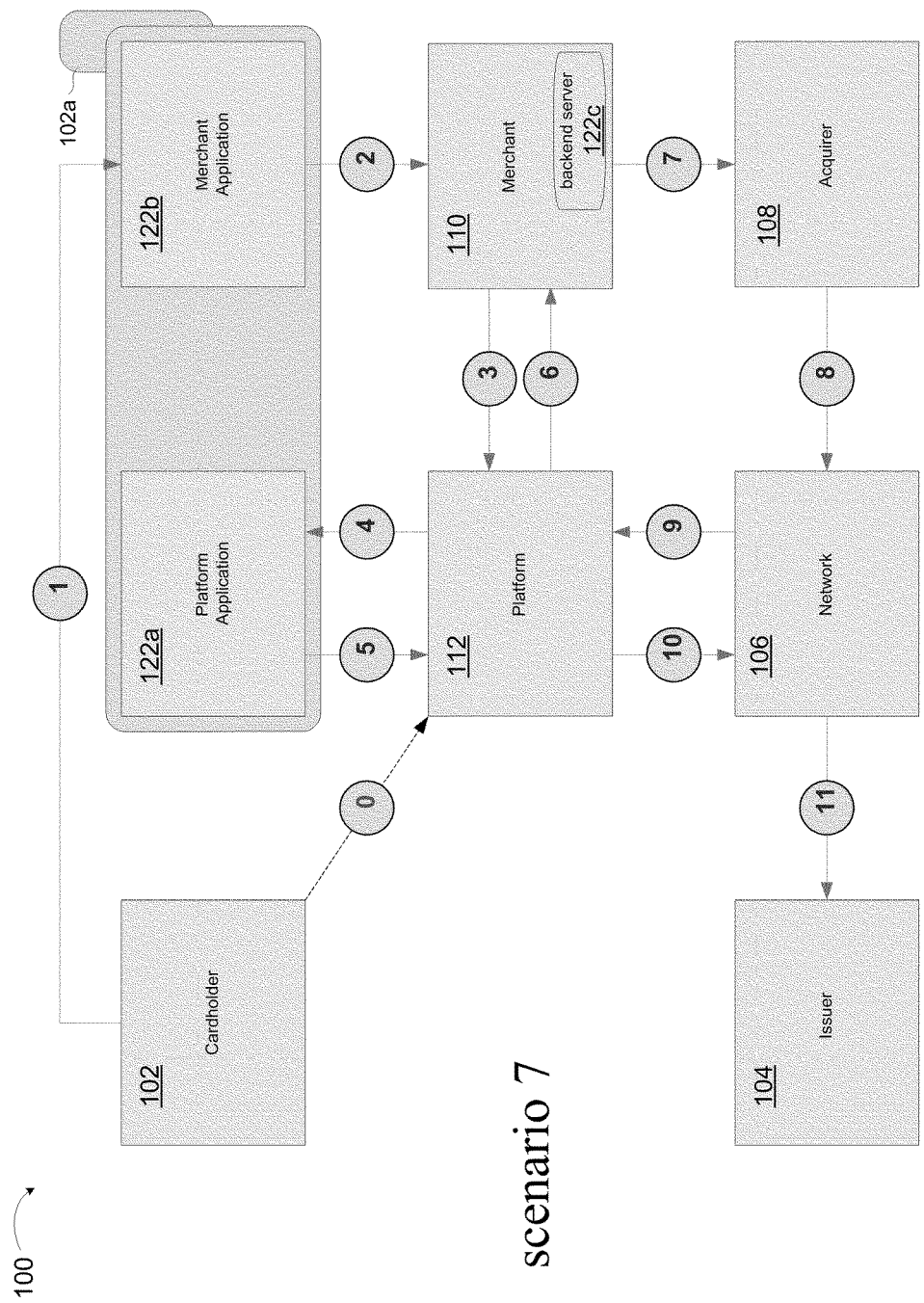

FIG. 8 illustrates a typical transaction scenario (scenario 7) in accordance with an embodiment of the present invention for another example of mobile and remote purchasing (e.g., using a cell phone) wherein the merchant 110 communicates with the central platform 112.

A transaction may commence, for example, with a cardholder 102 using their mobile communication device 102a to make a purchase (step 1). For example, FIG. 8 shows a merchant application 122b provided in, and executing on, the mobile communication device 102b. At step 2, during check-out processing, the merchant application 122b may communicate the merchant backend server 122c of the merchant 110 to send purchase order information to the backend server. At step 3, the merchant backend server 122c may send a request for a proxy dynamic value to the central platform 112.

At steps 4 and 5, the central platform 112 may interact with the cardholder 102 in order to identify a selected portable payment device from the cardholder as describe above, including perhaps conducting a verification process to verify the cardholder. At step 6, if the cardholder 102 is verified, the central platform 112 may send a proxy dynamic value (e.g., a TPAN) to the merchant backend server 122c of the merchant 110.

Authentication processing may include the merchant backend server 122c routing the TPAN to the acquirer 108 (step 7), who then sends it to the payment network 106 (step 8). The payment network 106 may then route the TPAN to the central platform 112 (step 9), which then substitutes the received TPAN with an actual PAN and sends it back to the payment network (step 10). The payment network 106 may then route the actual PAN to the issuer 104 (step 11) in order to continue with the authentication process. It is noted that during the clearing process (e.g., at the end of the business day), a similar TPAN substitution may be performed.

Figure 9:
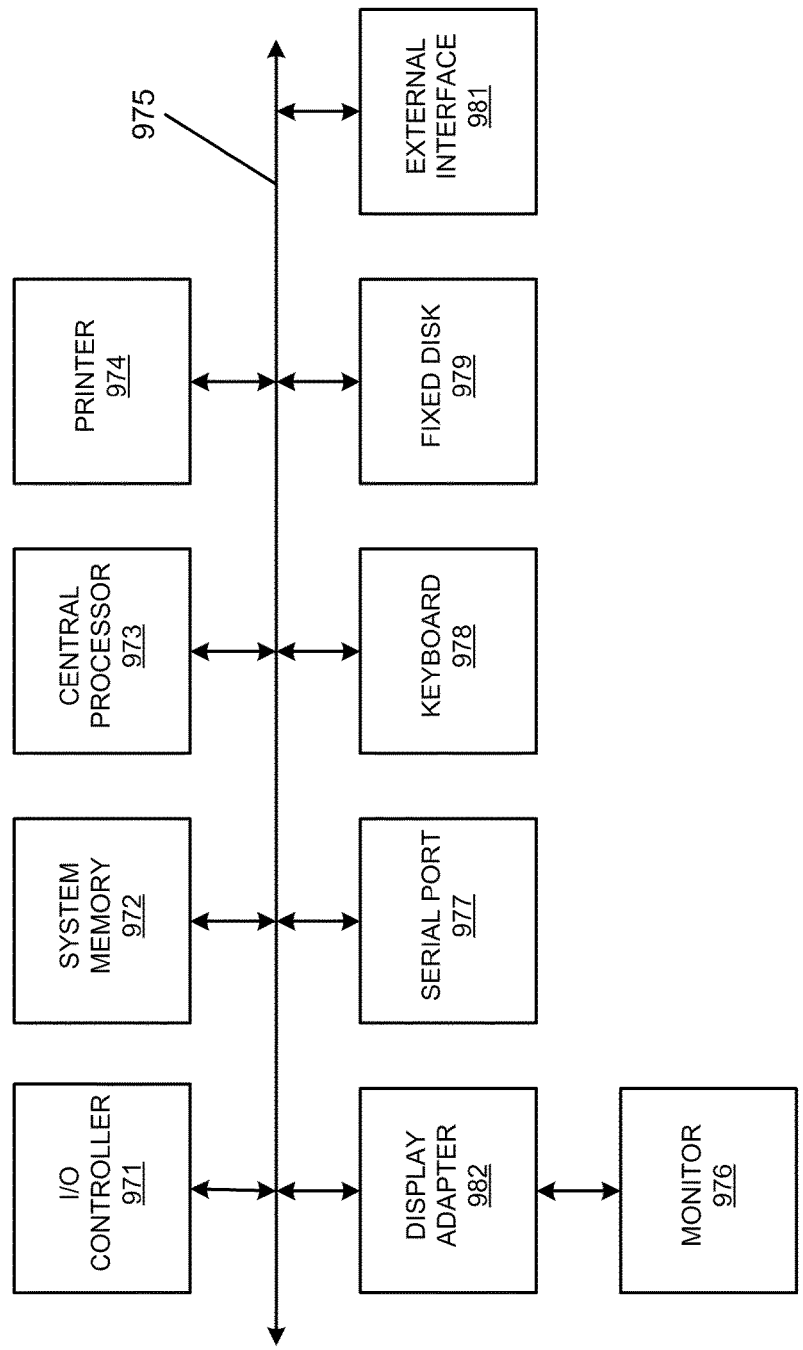
FIG. 9 is a generalized diagram of a computer system embodiment of the present invention.

FIG. 9 illustrates a computer system that can be used to implement computer system embodiments of the present invention. In an embodiment, the computer system may include an interface such as a video display device. The interface may be a web portal that a user can access over the internet. The web portal may include a login screen for subscribers. The interface may be a GUI delivered to a mobile communication device, such as a PDA or cellular phone.

Any of the entities or components described above may include one or more of the subsystems or components shown in FIG. 9. The subsystems shown in the figure are interconnected via a system bus 975. Additional subsystems such as a printer 974, keyboard 978, fixed disk 979, monitor 976, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 can be used to connect the computer apparatus to a wide area network such as the Internet, a mouse input device, or a scanner. The interconnection via system bus allows the central processor 973 to communicate with each subsystem and to control the execution of instructions from system memory 972 or the fixed disk 979, as well as the exchange of information between subsystems. The system memory 972 and/or the fixed disk 979 may embody a computer readable medium that causes the central processor 973 to perform steps described above.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

Figure 10:
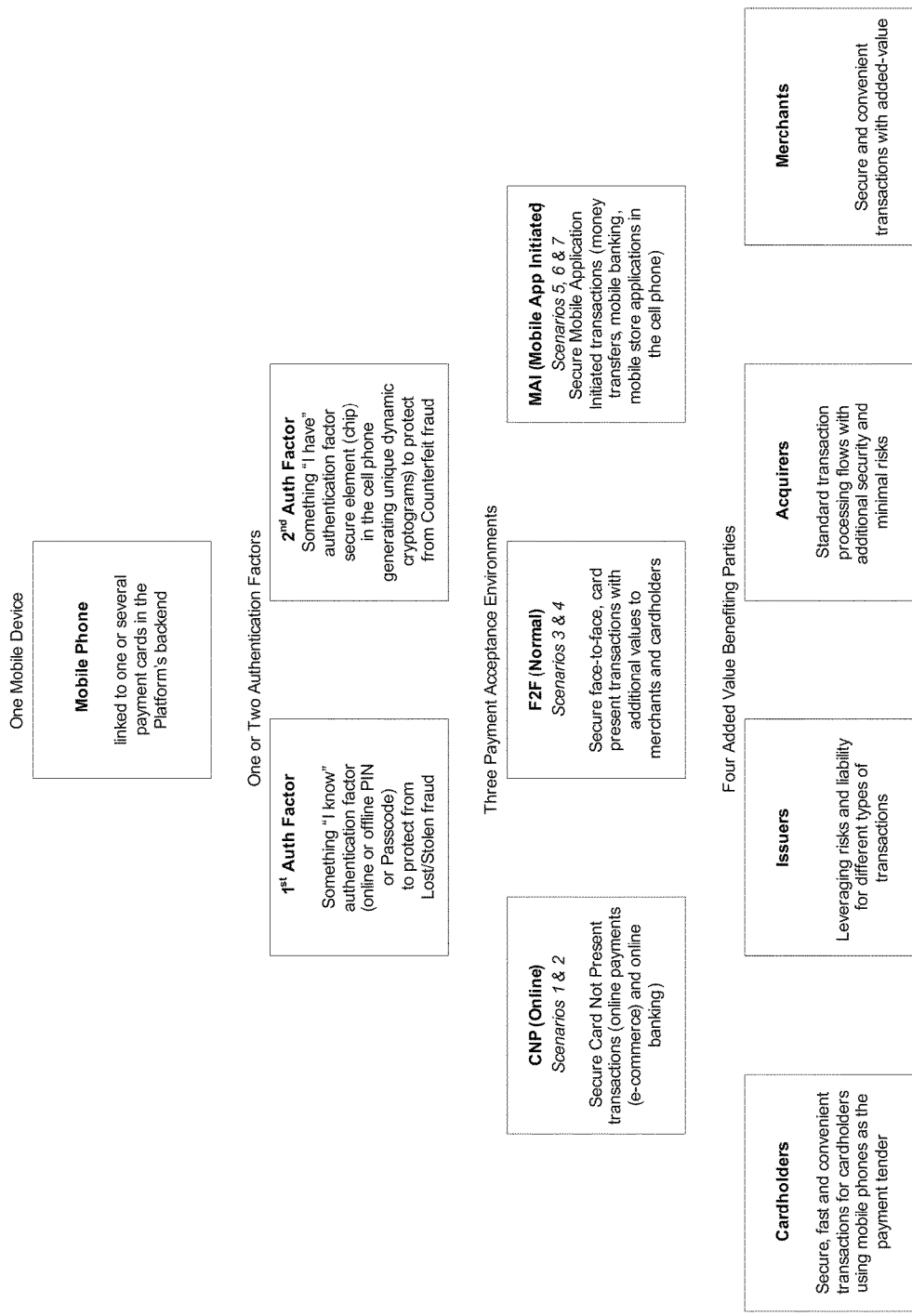
FIG. 10 illustrates various advantages provided by embodiments of the present invention.

FIG. 10 illustrates an overview of embodiments of the present invention and a brief summary of value-added benefits to participants of the four-party payment model.

Advantages of the disclosed embodiments include reducing undue friction for cardholders in the checkout process of an e-commerce or m-commerce transaction, providing a secure checkout process without the intrusive inquiries of personal information from the cardholder. The cardholder can use their phone as a personal and trusted payment device when making a purchase across, theoretically, any payment environment. The cardholder experience includes a streamlined check-out process: he needs only enter his cell phone number. The transaction is more secure, whether conducted in person or online or via a mobile device, since no real data about the card is exchanged between the cardholder and the Merchant. Flexibility in desired security is easily provided, whether one- or two-factor authentication. The cardholder can easily choose from among multiple portable payment devices (e.g., multiple credit cards) on their cell phone. Embodiments also facilitate record keeping by storing transaction receipts to manage payments.

Merchants benefit from the disclosed embodiment from increased participation in online commercial activity and increase opportunities through new online channels and retailing strategies. Merchants also benefit from reduced fraud due to strong authentication options (one- or two-factor authentication) and via the use of a proxy dynamic value such as a temporary PAN. A faster check-out process allows the Merchant to quickly conclude the transaction process so that he can move on to the next customer. Access to the cardholder's information (e.g., address) is easily efficiently accomplished without added cardholder friction.

Embodiments of the present invention may even benefit cell service carriers. For example, embodiments of the present invention may enhance the value of cell phones and other mobile device, and thus drive the demand for such devices for use as purchase and payment tools.

What is claimed is:

1. A method for conducting a payment transaction between a cardholder and a merchant comprising:
in response to initiation of the payment transaction by the cardholder, receiving, at a computer system, a request to obtain a proxy dynamic value from a merchant computer associated with a merchant, the computer system being distinct from an issuing bank and distinct from an acquiring bank;
in response to receiving the request to obtain the proxy dynamic value from the merchant computer, presenting, by the computer system to a cardholder communication device, the cardholder with a list of portable payment devices the cardholder has enrolled with the computer system;
receiving, a selection of a portable payment device from the list of portable payment devices, from the cardholder communication device;
generating and associating, by the computer system, a proxy dynamic value which is distinct from and corresponds to a primary account number (PAN) of the portable payment device; and
providing, by the computer system, the proxy dynamic value to the merchant computer;
receiving, by the computer system, the proxy dynamic value after the merchant computer receives the proxy dynamic value; and
returning, by the computer system, the primary account number,
wherein the primary account number is used to complete the payment transaction.

2. The method of claim 1 wherein the proxy dynamic value is received from an acquiring bank of the merchant, and the primary account number is returned to the acquiring bank, wherein conclusion of the payment transaction includes the acquiring bank sending the corresponding PAN to an issuing bank of the cardholder.

3. The method of claim 1 wherein the proxy dynamic value is formatted as the primary account number.

4. The method of claim 1 wherein the portable payment devices include one or more of credit cards, debit cards, or pre-paid cards.

5. The method of claim 1, wherein the generated proxy dynamic value is valid during a single payment transaction.

6. The method of claim 1, wherein a new proxy dynamic value is generated responsive to each payment transaction with the portable payment device.

7. The method of claim 1, further comprising:
after receiving the proxy dynamic value, determining, by the computer system, the primary account number based at least in part on the proxy dynamic value.

8. The method of claim 1, wherein:
the cardholder provides a user identifier distinct from the PAN and distinct from the proxy dynamic value to the merchant computer during initiation of the payment transaction;
the merchant computer provides the user identifier to the computer system as part of the request for the proxy dynamic value; and
the computer system associates the generated proxy dynamic value with the PAN based at least in part on the user identifier.

9. The method of claim 8, wherein the payment transaction is initiated from a mobile phone having an associated mobile phone number and the user identifier comprises the mobile phone number.

10. The method of claim 1, wherein the proxy dynamic value is newly generated by the computer system in response to receiving the request for the proxy dynamic value from the merchant computer.

11. The method of claim 1 wherein
receiving, by the computer system, the proxy dynamic value after the merchant computer receives the proxy dynamic value comprises receiving, by the computer system, the proxy dynamic value from a payment processing network after the merchant computer receives the proxy dynamic value; and
returning, by the computer system, the primary account number comprises returning, by the computer system, the primary account number to the payment processing network.

12. The method of claim 11 wherein the payment processing network forwards the primary account number to an issuer computer associated an issuer of the primary account number after the payment processing network receives the primary account number.

13. A computer system comprising;
a processor; and
a computer readable medium coupled to the processor, the computer readable medium comprising code, executable by the processor to implement a method comprising
in response to initiation of a payment transaction by a cardholder, receiving, at the computer system, a request to obtain a proxy dynamic value from a merchant computer associated with a merchant, the computer system being distinct from an issuing bank and distinct from an acquiring bank;
in response to receiving the request to obtain the proxy dynamic value from the computer system of the merchant, presenting, by the computer system to a cardholder communication device, the cardholder with a list of portable payment devices the cardholder has enrolled with the computer system;
receiving, a selection of a portable payment device from the list of portable payment devices, from the cardholder communication device;
generating and associating, by the computer system, a proxy dynamic value which is distinct from and corresponds to a primary account number (PAN) of the portable payment device; and
providing, by the computer system, the proxy dynamic value to the merchant computer;
receiving, by the computer system, the proxy dynamic value after the merchant computer receives the proxy dynamic value; and
returning, by the computer system, the primary account number, wherein the primary account number is used to complete the payment transaction.

14. The computer system of claim 13, wherein the proxy dynamic value is formatted as the primary account number.

15. The computer system of claim 13, wherein the method further comprises
   receiving, by the computer system, the proxy dynamic value after the merchant computer receives the proxy dynamic value comprises receiving, by the computer system, the proxy dynamic value from a payment processing network after the merchant computer receives the proxy dynamic value, and
   returning, by the computer system, the primary account number comprises returning, by the computer system, the primary account number to the payment processing network.

16. The computer system of claim 15 wherein the payment processing network forwards the primary account number to an issuer computer associated an issuer of the primary account number after the payment processing network receives the primary account number.

17. A transaction processing system comprising:
   the computer system of claim 13; and
   a merchant computer in communication with the computer system.

18. The transaction processing system of claim 17 further comprising:
   the cardholder communication device.

* * * * *